United States Patent
Jeon et al.

(10) Patent No.: US 12,126,511 B2
(45) Date of Patent: Oct. 22, 2024

(54) COMMUNICATION SYSTEM AND METHOD

(71) Applicant: LG Energy Solution, Ltd., Seoul (KR)

(72) Inventors: Young-Hwan Jeon, Daejeon (KR); Ho-Deuk Choi, Daejeon (KR); Jun-Hyeon Hong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/006,426

(22) PCT Filed: Jul. 30, 2021

(86) PCT No.: PCT/KR2021/010021
§ 371 (c)(1),
(2) Date: Jan. 23, 2023

(87) PCT Pub. No.: WO2022/025727
PCT Pub. Date: Feb. 3, 2022

(65) Prior Publication Data
US 2023/0269154 A1    Aug. 24, 2023

(30) Foreign Application Priority Data
Jul. 31, 2020  (KR) .................. 10-2020-0096201

(51) Int. Cl.
*H04L 43/0817* (2022.01)
*H04L 1/00* (2006.01)
*H04L 43/10* (2022.01)

(52) U.S. Cl.
CPC ........ *H04L 43/0817* (2013.01); *H04L 1/0083* (2013.01); *H04L 43/10* (2013.01)

(58) Field of Classification Search
CPC .. G07C 5/0833; G07C 5/0816; G07C 5/0808; G07C 5/008; G07C 5/085; B60W 50/0205; B60W 2530/209
See application file for complete search history.

(56) References Cited

U.S. PATENT DOCUMENTS

| 6,321,150 B1 | 11/2001 | Nitta |
| 6,622,070 B1 | 9/2003 | Wacker et al. |

(Continued)

FOREIGN PATENT DOCUMENTS

| CN | 102386445 A | 3/2012 |
| CN | 102393733 A | 3/2012 |

(Continued)

OTHER PUBLICATIONS

Akiya, N. et al., "Seamless Bidirectional Forwarding Detection (S-BFD) Alert Discriminator and BFD Path Tracing," Internet Engineering Task Force, Jan. 3, 2014, pp. 1-10.

(Continued)

*Primary Examiner* — Mahran Y Abu Roumi
(74) *Attorney, Agent, or Firm* — Lerner David LLP

(57) ABSTRACT

A communication system includes an information requesting device configured to generate a first communication packet including request information for each generated diagnostic trouble code when at least one diagnostic trouble code is generated and to output the generated first communication packet, and an information providing device configured to receive the first communication packet, extract each request information included in the received first communication packet, extract diagnosis information corresponding to each of the extracted request information, generate a second communication packet including answer information and at least one diagnosis information corresponding to each other to be distinguished from each other, and transmit the generated second communication packet to the information requesting device.

13 Claims, 4 Drawing Sheets

(56) References Cited

U.S. PATENT DOCUMENTS

| | | | |
|---|---|---|---|
| 10,109,119 B2* | 10/2018 | Keane | G07C 5/0808 |
| 2002/0183978 A1* | 12/2002 | Koyama | H04N 1/00002 |
| | | | 702/188 |
| 2008/0021607 A1* | 1/2008 | Kato | G07C 5/085 |
| | | | 701/31.4 |
| 2008/0267169 A1 | 10/2008 | Mundra et al. | |
| 2011/0144858 A1* | 6/2011 | Yun | H04L 12/40006 |
| | | | 370/328 |
| 2013/0261878 A1 | 10/2013 | Fukuta | |
| 2013/0342368 A1 | 12/2013 | Nathanson | |
| 2014/0288761 A1 | 9/2014 | Butler et al. | |
| 2014/0312852 A1 | 10/2014 | Won et al. | |
| 2016/0121816 A1* | 5/2016 | Koo | H04L 12/4013 |
| | | | 370/476 |
| 2016/0261140 A1 | 9/2016 | Won et al. | |
| 2017/0221357 A1 | 8/2017 | Nathanson | |
| 2018/0096539 A1* | 4/2018 | Merg | G07C 5/02 |
| 2019/0304213 A1* | 10/2019 | Chen | G07C 5/0833 |
| 2020/0079238 A1 | 3/2020 | Kwon et al. | |
| 2020/0159943 A1 | 5/2020 | Rocci et al. | |
| 2021/0264384 A1* | 8/2021 | Chau | G06K 7/1413 |
| 2022/0254461 A1* | 8/2022 | Vaughan | G06N 5/01 |

FOREIGN PATENT DOCUMENTS

| | | |
|---|---|---|
| CN | 104655947 A | 5/2015 |
| CN | 108469802 A | 8/2018 |
| CN | 109213132 A | 1/2019 |
| CN | 110209505 A | 9/2019 |
| CN | 110515366 A | 11/2019 |
| CN | 110888411 A | 3/2020 |
| CN | 111351669 A | 6/2020 |
| JP | 2000156685 A | 6/2000 |
| JP | 2004511188 A | 4/2004 |
| JP | 2005044309 A | 2/2005 |
| JP | 2006064651 A | 3/2006 |
| JP | 2007324697 A | 12/2007 |
| JP | 200824015 A | 2/2008 |
| JP | 2013028238 A | 2/2013 |
| JP | 5598491 B2 | 10/2014 |
| JP | 201747757 A | 3/2017 |
| KR | 20100023509 A | 3/2010 |
| KR | 20140124705 A | 10/2014 |
| KR | 101573637 B1 | 12/2015 |
| KR | 20190071465 A | 6/2019 |
| KR | 102097134 B1 | 4/2020 |
| KR | 102110581 B1 | 5/2020 |

OTHER PUBLICATIONS

International Search Report for Application No. PCT/KR2021/010021 mailed Nov. 10, 2021, pp. 1-3.

Reorda, M.S. "Test of Automotive Boards; Master Degree in Computer Engineering Embedded Systems," 2019, pp. 1-80, [retrieved on Oct. 21, 2021]. Retrieved from <https://webthesis.biblio.polito.it/12438/1/tesi.pdf>.

Anonymous, "ISO 14229-1 Road vehicles—Unified diagnostic services (UDS) Part 1: Application layer" Reference No. ISO 14229-1-2020 (E), Feb. 2020, pp. 1-490, Retrieved from the Internet:URL:https://www.iso.org/obp/ui#iso:std:iso:14229:-1:ed-3:v1:en, [retrieved on Dec. 1, 2022].

Bartish, M. "Analysis and System Test of Powertrain Embedded Control Systems in Heavy Vehicles during Start-Up and Shutdown" KTH Computer Science and Communication, Dec. 2011, pp. 1-73, Retrieved from the Internet: https://www.nada.kth.se/utbildning/grukth/exjobb/rapportlistor/2011/rapporter11/bartish_mark_11065.pdf. [retrieved on Feb. 25, 2016].

Extended European Search Report including Written Opinion for Application No. 21849786.5 dated Aug. 17, 2023, pp. 1-10.

* cited by examiner

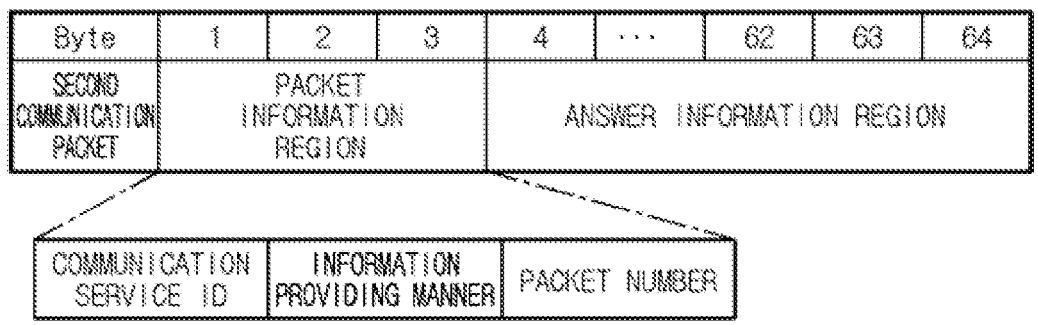

FIG. 6

| Byte | 1 | 2 | 3 | 4 | 5 | 6 | 7 | 8 |
|---|---|---|---|---|---|---|---|---|
| SECOND COMMUNICATION PACKET | 59 | 04 | 1 | FIRST ANSWER INFORMATION | | | | |
| | FIRST ANSWER INFORMATION | FIRST DIAGNOSIS INFORMATION | | | | | | |
| | FIRST DIAGNOSIS INFORMATION | | | DELIMITER INFORMATION | SECOND ANSWER INFORMATION | | | |
| | SECOND ANSWER INFORMATION | SECOND DIAGNOSIS INFORMATION | | | | | | |
| | SECOND DIAGNOSIS INFORMATION | | | | | | | DELIMITER INFORMATION |
| | THIRD ANSWER INFORMATION | | | | | | THIRD DIAGNOSIS INFORMATION | |
| | THIRD DIAGNOSIS INFORMATION | | | | | | | |
| | | | | | | | | |

COMMUNICATION SYSTEM AND METHOD

CROSS-REFERENCE TO RELATED APPLICATIONS

The present application is a national phase entry under 35 U.S.C. § 371 of International Application No. PCT/KR2021/010021 filed Jul. 30, 2021, which claims priority from Korean Patent Application No. 10-2020-0096201 filed on Jul. 31, 2020, all of which are incorporated herein by reference.

TECHNICAL FIELD

The present disclosure relates to a communication system and method, and more specifically, to a communication system and method that may reduce the waste of system resources consumed for communication.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

Meanwhile, various electronic control units (ECUs) are included in a device equipped with such a battery, and the ECUs communicate with each other to provide information or receive information from other ECUs. Taking a vehicle as an example, various functions and controls increase in the vehicle, and in particular, as an electric vehicle equipped with a battery is put to practical use, the amount of data transmission and reception between ECUs is increasing. Accordingly, communication standards and technologies for improving the efficiency of data communication between ECUs have been proposed.

For example, Patent Literature 1 discloses only a configuration in which a data receiving side changes a reception mode to a high speed mode or a normal mode using CAN (Controller Area Network) communication. However, Patent Literature 1 has a problem in that it is difficult to apply to a device such as an electric vehicle in which various information must be provided in real time because the traffic load is improved by changing the reception mode.

(Patent Literature 1) KR 10-1573637 B1

SUMMARY

Technical Problem

The present disclosure is designed to solve the problems of the related art, and therefore the present disclosure is directed to providing a communication system and method that may reduce the communication load and reduce the waste of system resources consumed for communication.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a communication system, comprising: an information requesting device configured to in response to one or more diagnostic trouble codes being generated, generate a first communication packet including request information for each of the one or more generated diagnostic trouble codes and output the generated first communication packet; and an information providing device configured to receive the first communication packet, for each diagnostic trouble code included in the received first communication packet, extract the request information for the diagnostic trouble code, and extract diagnosis information corresponding to each of the extracted request information, generate a second communication packet including answer information and at least one diagnosis information corresponding to each other and distinguishable from each other, and transmit the generated second communication packet to the information requesting device.

The one or more diagnostic trouble codes include at least a first diagnostic trouble code and a second diagnostic trouble code, the information requesting device may be configured to further include delimiter information for distinguishing the first diagnostic trouble code from the second diagnostic trouble code in the first communication packet.

The information providing device may be configured to extract the first diagnostic trouble code and the second diagnostic trouble code from the received first communication packet based on the delimiter information.

The information providing device may be configured to further include the delimiter information in the second communication packet in order to distinguish the answer information and the at least one diagnosis information from each other.

The information providing device may include a data identifier list preset for each extracted request information and may be configured to, for each diagnostic trouble code included in the received first communication packet, determine a data identifier corresponding to the request information based on the data identifier list and extract the diagnosis information corresponding to the determined data identifier.

The information requesting device may be configured to select at least one target identifier from the data identifier list and include an identification number for the selected at least one target identifier in the first communication packet.

The information requesting device may be configured to configured to, for each generated diagnostic trouble code, include a corresponding identification number of the selected at least one target identifier in the first communication packet.

For a plurality of selected target identifiers having identification numbers that are consecutive, the information requesting device may be configured to include in the first communication packet a representative number from the identification numbers and a number indicating a quantity of the selected target identifiers.

The information providing device may be configured to, for each diagnostic trouble code included in the received first communication packet, extract the identification number from the first communication packet, determine a target identifier corresponding to the identification number in the data identifier list, and extract diagnosis information corresponding to the determined target identifier.

An electric vehicle according to another aspect of the present disclosure may comprise the communication system according to an aspect of any of the embodiments described in the present disclosure.

A communication method according to still another aspect of the present disclosure may comprise: generating, by an information requesting device, a first communication packet including request information for each of one or more generated diagnostic trouble codes; outputting, by the information requesting device, the generated first communication packet; receiving, by an information providing device, the first communication packet; for each diagnostic trouble code included in the received first communication packet: extracting, by the information providing device, the request information of the diagnostic trouble code included in the received first communication packet; extracting, by the information providing device, diagnosis information corresponding to the extracted request information; and generating, by the information providing device, a second communication packet including answer information and at least one diagnosis information corresponding to each other to be distinguished from each other and outputting the generated second communication packet.

Advantageous Effects

According to one aspect of the present disclosure, by adopting a first communication packet structure that may include a plurality of request information and a second communication packet structure that may include a plurality of answer information and at least one diagnosis information corresponding to each answer information, there is an advantage of dramatically reducing the communication load applied to the communication bus and thus dramatically improving the communication efficiency.

The effects of the present disclosure are not limited to the effects mentioned above, and other effects not mentioned will be clearly understood by those skilled in the art from the description of the claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 4 is a diagram schematically showing a structure of a second communication packet used in the communication system according to an embodiment of the present disclosure.

FIG. 5 is a diagram schematically showing an exemplary configuration of the first communication packet used in the communication system according to an embodiment of the present disclosure.

FIG. 6 is a diagram schematically showing an exemplary configuration of the second communication packet used in the communication system according to an embodiment of the present disclosure.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
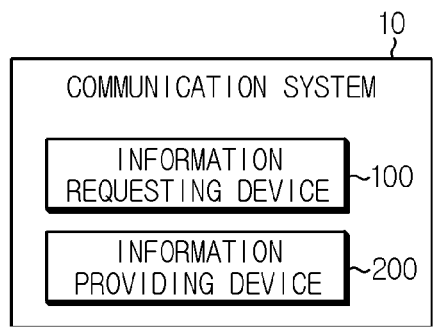
FIG. 1 is a diagram schematically showing a communication system according to an embodiment of the present disclosure.
Figure 2:
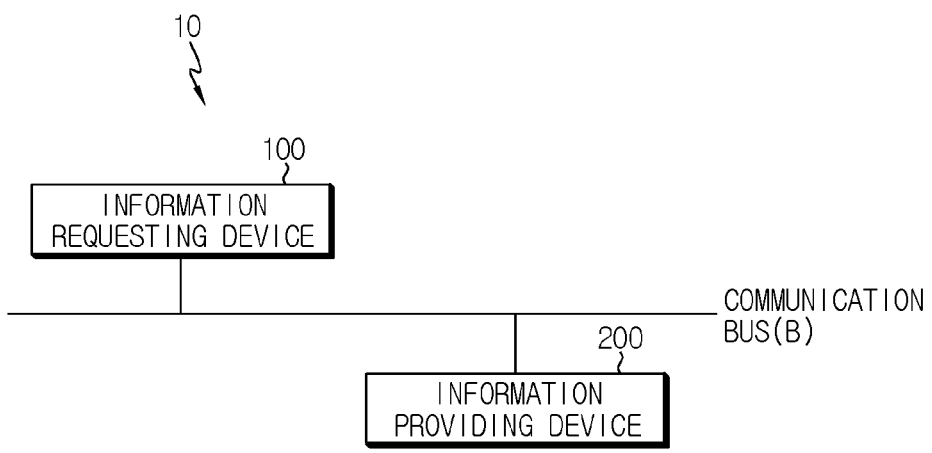
FIG. 2 is a diagram schematically showing an exemplary configuration of the communication system according to an embodiment of the present disclosure.

FIG. 1 is a diagram schematically showing a communication system 10 according to an embodiment of the present disclosure. FIG. 2 is a diagram schematically showing an exemplary configuration of the communication system 10 according to an embodiment of the present disclosure.

Referring to FIGS. 1 and 2, the communication system 10 according to an embodiment of the present disclosure may include an information requesting device 100 and an information providing device 200.

The information requesting device 100 may be configured to generate a first communication packet including request information for each generated diagnostic trouble code, when at least one diagnostic trouble code is generated.

Here, the diagnostic trouble code (DTC) may indicate a diagnosis result for various states of a battery pack and/or various electronic control units (ECUs) included in an electric vehicle.

Preferably, the diagnostic trouble code may be generated by the information providing device 200, and the generated diagnostic trouble code may be provided to the information requesting device 100. For example, when the voltage of the battery pack exceeds a reference voltage, a diagnostic trouble code for overvoltage may be generated. In this case, the information providing device 200 generating the diagnostic trouble code may be a battery management system (BMS) connected to the battery pack and configured to diagnose the state of the battery pack.

Specifically, the information requesting device 100 may identify and interpret each generated diagnostic trouble code, but cannot directly obtain diagnosis information that is the cause of the diagnostic trouble code. Accordingly, the information requesting device 100 may generate a first communication packet to obtain diagnosis information corresponding to the generated diagnostic trouble code from the information providing device 200.

Here, when a plurality of diagnostic trouble codes are generated, the information requesting device 100 may include a plurality of request information respectively corresponding to the plurality of diagnostic trouble codes in the first communication packet.

For example, in some cases, a plurality of diagnostic trouble codes may be generated simultaneously. If one first communication packet may can contain only one request information, the information requesting device 100 may generate a plurality of first communication packets and output each of the plurality of first communication packets to a communication bus B in a set order or in an arbitrary order. In addition, the information providing device 200 may receive the plurality of first communication packets, respectively, and output a plurality of second communication packets corresponding to the plurality of first communication packets to the communication bus B. In this communication process, since a plurality of first communication packets and a plurality of second communication packets are output to the communication bus B, the communication bus B may be used inefficiently and the communication load for the communication system 10 may be increased. Therefore, the first communication packet according to an embodiment of the present disclosure may include at least one request information.

Figure 3:
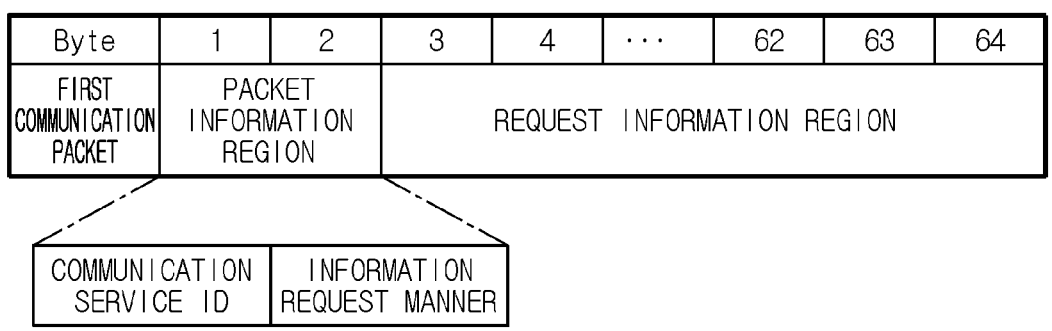
FIG. 3 is a diagram schematically showing a structure of a first communication packet used in the communication system according to an embodiment of the present disclosure.

FIG. 3 is a diagram schematically showing a structure of the first communication packet used in the communication system 10 according to an embodiment of the present disclosure.

For example, in the embodiment of FIG. 3, the first communication packet may have a total size of 64 bytes. Here, 2 bytes may be allocated to a packet information region, and 62 bytes may be allocated to a request information region. Specifically, the packet information region may include general information about the first communication packet. For example, the packet information region may include a communication service ID and a value for an information request manner. For example, according to the ISO 14229 protocol, the communication service ID included in the packet information region of the first communication packet may correspond to a ReadDTClnformation request Service Id parameter, and the information request manner may correspond to a sub-function parameter.

In addition, in the embodiment of FIG. 3, request information may be included in the request information region of the first communication packet. For example, the request information may include a diagnostic trouble code ID and diagnostic trouble code storage information. Here, the diagnostic trouble code ID is identification information capable of identifying the diagnostic trouble code. In addition, the diagnostic trouble code storage information is information indicating a location where the diagnostic trouble code ID included in the request information region of the first communication packet is stored in a storage space where diagnostic trouble codes ID of a plurality of diagnostic trouble codes that can be generated is stored. For example, according to the ISO 14229 protocol, the diagnostic trouble code ID may correspond to a DTCMaskRecord parameter, and the diagnostic trouble code storage information may correspond to a DTCSnapshotRecordNumber parameter.

In addition, the information requesting device 100 may be configured to output the generated first communication packet.

For example, in the embodiment of FIG. 2, the information requesting device 100 may output the first communication packet to the communication bus B.

Specifically, the information requesting device 100 and the information providing device 200 may be connected to each other to be able to communicate with each other through the communication bus B. For example, the information requesting device 100 and the information providing device 200 may perform CAN FD (Controller Area Network with Flexible Data rate) communication using the communication bus B.

The information providing device 200 may be configured to receive the first communication packet.

For example, in the embodiment of FIG. 2, the information providing device 200 may receive the first communication packet output to the communication bus B.

In addition, the information providing device 200 may be configured to extract each request information included in the received first communication packet.

For example, when a plurality of request information is included in the first communication packet, the information providing device 200 may extract each of the plurality of request information from the first communication packet.

The information providing device 200 may be configured to extract diagnosis information corresponding to each of the extracted request information.

Specifically, the information providing device 200 may be configured to determine at least one data identifier (DID) corresponding to each of the extracted request information. Here, the information providing device 200 may be configured to include a data identifier list preset for each of the request information. That is, the information providing device 200 may be configured to include a data identifier list preset for each diagnostic trouble code.

The data identifier list may be a list including items corresponding to each diagnostic trouble code. For example, the data identifier list may be a list in which at least one data identifier corresponding to each of all diagnostic trouble codes that can be generated is defined. More specifically, the data identifier list may be a list defining at least one data identifier corresponding to each of the plurality of diagnostic trouble codes.

For example, it is assumed that the plurality of diagnostic trouble codes include an A diagnostic trouble code, a B diagnostic trouble code, and a C diagnostic trouble code. The A data identifier list may be provided for each of the A diagnostic trouble code, the B diagnostic trouble code, and the C diagnostic trouble code. In addition, the data identifier list corresponding to the A diagnostic trouble code may include at least one data identifier related to the A diagnostic trouble code, and the data identifier list corresponding to the B diagnostic trouble code may include at least one data identifier related to the B diagnostic trouble code, and the data identifier list corresponding to the C diagnostic trouble code may include at least one data identifier related to the C diagnostic trouble code.

For example, snapshot data defined in the ISO 14229 protocol may correspond to the data identifier list for each diagnostic trouble code stored in the information providing device 200. According to the ISO 14229 protocol, the snapshot data may include identification information for at least one diagnostic trouble code in a first lower layer. In addition, the snapshot data may include a data identifier (DID) indicating the identification information for diagnosis information corresponding to each diagnostic trouble code and a value for the corresponding diagnosis information in a second lower layer. That is, each data identifier list stored in the information providing device 200 may correspond to a data identifier corresponding to each diagnostic trouble code included in the snapshot data defined in the ISO 14229 protocol and a value for the diagnosis information.

In addition, the information providing device 200 may be configured to determine the at least one data identifier corresponding to each of the request information based on the provided data identifier list. That is, the information providing device 200 may determine at least one data identifier for a diagnostic trouble code corresponding to the request information based on the provided data identifier list.

Specifically, one data identifier list may include at least one data identifier and a value corresponding thereto. Accordingly, the information providing device 200 may select a data identifier list corresponding to the request information included in the first communication packet and select at least one data identifier included in the selected data identifier list.

In addition, the information providing device 200 may be configured to extract diagnosis information corresponding to the determined at least one data identifier.

Here, the diagnosis information may be a value corresponding to the data identifier. That is, the data identifier may be identification information that may identify the diagnosis information, and the diagnosis information may be a specific value for the corresponding identification information.

For example, the data identifier may include voltage information of the battery pack, current information of the battery pack, temperature information of the battery pack, and the like. In addition, the diagnosis information may include a voltage value of the battery pack, a current value of the battery pack, a temperature value of the battery pack, and the like.

Preferably, in the information providing device 200, diagnosis information corresponding to the diagnostic trouble code may be stored in advance for each data identifier. For example, when a diagnostic trouble code for battery overvoltage is generated by the information providing device 200, diagnosis information for a voltage value of the battery pack may be stored to correspond to a data identifier for the voltage information of the battery pack.

Accordingly, the information providing device 200 may determine a data identifier corresponding to the request information included in the first communication packet and extract diagnosis information corresponding to the determined data identifier.

In addition, the information providing device 200 may be configured to generate a second communication packet including answer information and at least one diagnosis information corresponding to each other to be distinguished from each other.

For example, as described above, the first communication packet may include a plurality of request information. In addition, the information providing device 200 may generate a second communication packet including a plurality of answer information and a plurality of diagnosis information to correspond to each request information. Preferably, the information providing device 200 may generate a second communication packet so that one answer information and at least one diagnosis information corresponding thereto are distinguished from each other.

FIG. 4 is a diagram schematically showing a structure of the second communication packet used in the communication system 10 according to an embodiment of the present disclosure.

For example, in the embodiment of FIG. 4, the second communication packet may have a total size of 64 bytes, like the first communication packet. However, in the second communication packet, 3 bytes may be allocated to the packet information region, and 61 bytes may be allocated to the answer information region. Specifically, the packet information region may include general information about the second communication packet. For example, the packet information region of the second communication packet may include a communication service ID and a value for an information providing manner, similar to the packet information region of the first communication packet. For example, according to the ISO 14229 protocol, the communication service ID included in the packet information region of the second communication packet may correspond to the ReadDTClnformation response Service Id parameter, and the information providing manner may correspond to the reportType parameter. In addition, a packet number for flow control may be further included in the packet information region of the second communication packet. Preferably, the packet number may include a natural number expressed in hexadecimal. For example, when a plurality of second communication packets are generated by the information providing device 200, if the packet number is 1, it may indicate a second communication packet in a first order among the plurality of second communication packets. In addition, if the packet number is 2, it may indicate a second communication packet in a second order among the plurality of second communication packets. That is, if the packet number is N, it may indicate a second communication packet in an $N^{th}$ order among the N number of second communication packets. Conversely, if one second communication packet is generated by the information providing device 200, the packet number of the generated second communication packet may be 1.

In addition, in the embodiment of FIG. 4, answer information and diagnosis information may be included in the answer information region of the second communication packet. For example, the answer information may include a diagnostic trouble code ID, diagnostic trouble code status information, and diagnostic trouble code storage information. Here, the diagnostic trouble code ID may be ID information capable of identifying a diagnostic trouble code, the diagnostic trouble code status information may be status information of the generated diagnostic trouble code, and the diagnostic trouble code storage information may be information indicating a location where a diagnostic trouble code ID included in the answer information region is stored in a storage space where the diagnostic trouble codes ID for a plurality of diagnostic trouble codes that can be generated are stored. For example, according to the ISO 14229 protocol, the diagnostic trouble code ID and the diagnostic trouble code status information may correspond to the DTCAndStatusRecord parameter, and the diagnostic trouble code storage information may correspond to the DTCSnapshotRecordNumber parameter. More specifically, the diagnostic trouble code status information may correspond to the statusOfDTC parameter included in the DTCAndStatusRecord parameter.

In addition, the information providing device 200 may be configured to transmit the generated second communication packet to the information requesting device 100.

Specifically, the information providing device 200 may output the generated second communication packet to the communication bus B. In addition, the information requesting device 100 may receive the second communication packet through the communication bus B. Thereafter, the information requesting device 100 may extract answer information and diagnosis information from the received second communication packet. If the information requesting device 100 extracts the answer information and the diagnosis information from the second communication packet, communication between the information requesting device 100 and the information providing device 200 may be terminated.

By adopting a first communication packet structure that may include a plurality of request information and a second communication packet structure that may include a plurality of answer information and at least one diagnosis information corresponding to each answer information, the communication system 10 has an advantage of dramatically reducing the communication load applied to the communication bus B and thus dramatically improving the communication efficiency.

When a plurality of the diagnostic trouble codes are generated, the information requesting device 100 may be configured to further include delimiter information for distinguishing a plurality of request information for the plurality of generated diagnostic trouble codes in the first communication packet.

Specifically, the delimiter information may be a dummy code that can be clearly distinguished from the request information. Accordingly, the information requesting device 100 may further include delimiter information between the plurality of request information in order to distinguish the plurality of request information from each other.

FIG. 5 is a diagram schematically showing an exemplary configuration of the first communication packet used in the communication system 10 according to an embodiment of the present disclosure.

Referring to FIGS. 3 and 5, the packet information region of the first communication packet may include 19 and 04. Specifically, the communication service ID included in the packet information region may be 19, and the information request manner may be 40. In addition, a total of three request information may be included in the request information region. Also, delimiter information may be included between the request information. That is, when generating the first communication packet to include a plurality of request information, the information requesting device 100 may include the delimiter information in the first communication packet to clearly distinguish the plurality of request information.

For example, in the embodiment of FIG. 5, the first request information may include a first diagnostic trouble code ID and first diagnostic trouble code storage information. In addition, the first request information may be distinguished from the second request information by the delimiter information. The second request information may include a second diagnostic trouble code ID and second diagnostic trouble code storage information. In addition, the second request information may be distinguished from third request information by the delimiter information. The third request information may include a third diagnostic trouble code ID and third diagnostic trouble code storage information.

The information providing device 200 may be configured to extract each of the plurality of request information to be distinguished from each other based on the delimiter information from the received first communication packet.

As described above, the delimiter information may be a dummy code capable of distinguishing the plurality of request information from each other. Accordingly, the information providing device 200 may extract the plurality of request information to be distinguished from each other based on the delimiter information.

That is, the communication system 10 according to an embodiment of the present disclosure adopts a first communication packet structure that may further include delimiter information, so that even if a plurality of request information is included in one first communication packet, the information providing device 200 may extract the plurality of request information to be clearly distinguished from each other.

When the extracted request information is in plurality, the information providing device 200 may be configured to further include the delimiter information in the second communication packet in order to distinguish the corresponding answer information and at least one diagnosis information from each other for the plurality of request information.

Specifically, when the first communication packet includes a plurality of request information, the information providing device 200 may extract at least one diagnosis information corresponding to each of the plurality of request information. In addition, the information providing device 200 may include delimiter information in the answer information region of the second communication packet in order to store one answer information and at least one diagnosis information corresponding thereto to be distinguished. Here, the delimiter information may be the same as the delimiter information included in the first communication packet.

FIG. 6 is a diagram schematically showing an exemplary configuration of the second communication packet used in the communication system 10 according to an embodiment of the present disclosure.

Referring to FIGS. 4 and 6, the packet information region of the second communication packet may include 59, 04, and 1. Specifically, the communication service ID included in the packet information region may be 59, the information providing manner may be 40, and the packet number may be 1. In addition, the answer information region may include a total of three answer information and a total of three diagnosis information. Also, the answer information and the diagnosis information corresponding to each other may be distinguished by the delimiter information. That is, when the information providing device 200 generates the second communication packet to include a plurality of answer information and a plurality of diagnosis information, the delimiter information may be included in the second communication packet to clearly distinguish the answer information and the diagnosis information corresponding to each other.

For example, in the embodiment of FIG. 6, the first answer information may include a first diagnostic trouble code ID, first diagnostic trouble code status information, and first diagnostic trouble code storage information. The first diagnosis information may include at least one data identifier corresponding to the first diagnostic trouble code and diagnosis information corresponding to each data identifier. In addition, the first diagnosis information may be distinguished from the second answer information by the delimiter information. The second answer information may include a second diagnostic trouble code ID, second diagnostic trouble code status information, and second diagnostic trouble code storage information. The second diagnosis information may include at least one data identifier corresponding to the second diagnostic trouble code and diagnosis information corresponding to each data identifier. In addition, the second diagnosis information may be distinguished from the third answer information by the delimiter information. The third answer information may include a third diagnostic trouble code ID, third diagnostic trouble code status information, and third diagnostic trouble code storage information. The third diagnosis information may include at least one data identifier corresponding to the third diagnostic trouble code and diagnosis information corresponding to each data identifier.

The information requesting device 100 may be configured to extract answer information and diagnosis information corresponding to each other from the received second communication packet to be distinguished from each other based on the delimiter information.

The information requesting device 100 may be configured to include the data identifier list.

Here, the data identifier list provided in the information requesting device 100 may be the same as the data identifier list provided in the information providing device 200. That is, the information requesting device 100 and the information providing device 200 may share at least one data identifier information corresponding to the diagnostic trouble code. However, even though the information providing device 200 stores diagnosis information (specific values) corresponding to each data identifier, the information requesting device 100 has only the data identifier list and must obtain the diagnosis information from the information providing device 200, differently from the information providing device 200.

In addition, the information requesting device 100 may be configured to select at least one among the at least one data identifier included in the data identifier list as a target identifier.

Specifically, the information requesting device 100 may select a part of the plurality of data identifiers defined in the data identifier list as the target identifier for the diagnostic trouble code.

For example, it is assumed that 5 data identifiers are defined in the data identifier list for the A diagnostic trouble code. The information requesting device 100 may select two data identifiers among five data identifiers as target identifiers.

In addition, the information requesting device 100 may be configured to further include an identification number for the selected at least one target identifier in the first communication packet.

That is, the information requesting device 100 may request the information providing device 200 to provide diagnosis information corresponding to the target identifier as the diagnosis information for the diagnostic trouble code.

For example, when two data identifiers are selected as target identifiers, the information requesting device 100 may include identification numbers for the two selected target identifiers in the request information region of the first communication packet.

In the embodiment of FIG. 5, if the information requesting device 100 further includes an identification number for the target identifier in the first communication packet, the size of the first request information may be increased. That is, the information requesting device 100 may include first request information containing the first diagnostic trouble code ID, the first diagnostic trouble code status information, the first diagnostic trouble code storage information, and the identification number for the target identifier in the first communication packet. Similarly, the information requesting device 100 may further include an identification number for a target identifier corresponding to each of the second request information and the third request information.

In addition, the information providing device 200 may be configured to extract the identification number from the first communication packet, determine a data identifier corresponding to the identification number in the data identifier list as the target identifier, and extract diagnosis information corresponding to the determined at least one target identifier.

That is, the information providing device 200 may extract only diagnosis information corresponding to the target identifier corresponding to the identification number included in the first communication packet as diagnosis information for the request information included in the first communication packet and provide the same to the information requesting device 100.

Therefore, the communication system 10 according to an embodiment of the present disclosure may save unnecessary wasted system resources and improve communication efficiency by adopting a communication packet structure in which the information requesting device 100 may selectively request diagnosis information.

In an embodiment according to the present disclosure, the information requesting device 100 may be configured to include each identification number of the selected at least one target identifier in the first communication packet.

If one target identifier is selected, the information requesting device 100 may include an identification number for the selected target identifier in the request information region.

If a plurality of target identifiers are selected and the identification numbers of the plurality of selected target identifiers are not consecutive, the information requesting device 100 may include a plurality of identification numbers in the request information region, respectively.

For example, in the embodiment of FIG. 5, it is assumed that the identification numbers for the target identifiers selected to correspond to the first request information are 1, 3, and 5 and each identification number is included in the request information region together with the first request information. Also, it is assumed that the identification number occupies the request information region by 1 byte. In this case, the size of the first request information included in the first communication packet may be increased to 7 bytes.

In another embodiment according to the present disclosure, when the identification numbers of the selected at least one target identifier are consecutive, the information requesting device 100 may be configured to include a representative number of the identification numbers and the number of the selected target identifiers in the first communication packet.

Specifically, the information requesting device 100 may select any one of the plurality of identification numbers as the representative number according to a predetermined rule. For example, the information requesting device 100 may select a smallest identification number among the plurality of identification numbers as the representative number. As another example, the information requesting device 100 may select a largest identification number among the plurality of identification numbers as the representative number.

Here, the rules for selecting a representative number among the plurality of identification numbers may be defined variously. That is, as long as the information providing device 200 is capable of accurately recognizing an identification number for a plurality of target identifiers based on the representative number and the number of target identifiers included in the first communication packet, any method may be applied without limitation.

For example, if the number of target identifiers selected by the information requesting device 100 is 4 and the plurality of identification numbers are 1, 2, 3, and 4, the information requesting device 100 may select 1 as the representative number. In addition, the information requesting device 100 may include 1 as a value for the representative number in the request information region of the first communication packet and include 4 as a value for the number of target identifiers. Accordingly, the information providing device 200 may determine that the identification numbers of the plurality of target identifiers selected by the information requesting device 100 are 1, 2, 3, and 4, based on the representative number (1) and the number of target identifiers (4) in the first communication packet.

An electric vehicle according to another embodiment of the present disclosure may include the communication system 10 according to an embodiment of the present disclosure.

The communication bus B connected to allow the information providing device 200 and the information requesting device 100 included in the communication system 10 to communicate with each other may be a vehicle communication network of an electric vehicle. For example, the communication bus B may be a communication bus B capable of CAN FD communication.

The information providing device 200 and the information requesting device 100 may be applied to various electronic control devices that may be included in an electric vehicle. For example, the electronic control unit may include an ACU (Airbag Control Unit), a BCM (Body Control Module), an ECU (Engine Control Unit), a PCM (Powertrain Control Module), a TCU (Transmission Control Unit), an ABS (Anti-lock Braking System), an ESC (Electronic Stability Control), a HPCU (Hybrid Power Control Unit), a BMS (Battery Management System), and a MCU (Motor Control Unit).

If the information providing device 200 is a BMS, the information providing device 200 may provide diagnosis information for a battery pack.

Since the electric vehicle according to another embodiment of the present disclosure may perform communication between electronic control units using the communication system 10, the load on the vehicle communication network can be reduced. Therefore, system resources of electronic control devices capable of communicating through the vehicle communication network can be efficiently utilized without being wasted unnecessary.

Meanwhile, the first communication packet generated by the information requesting device 100 may further include a separate head region. In addition, the head region may include data length code (DLC) included in the request information region of the first communication packet.

That is, when the information providing device 200 receives the first communication packet, it is possible to accurately extract at least one request information included in the request information region of the first communication packet by checking the data length code included in the head region of the first communication packet first.

Figure 7:
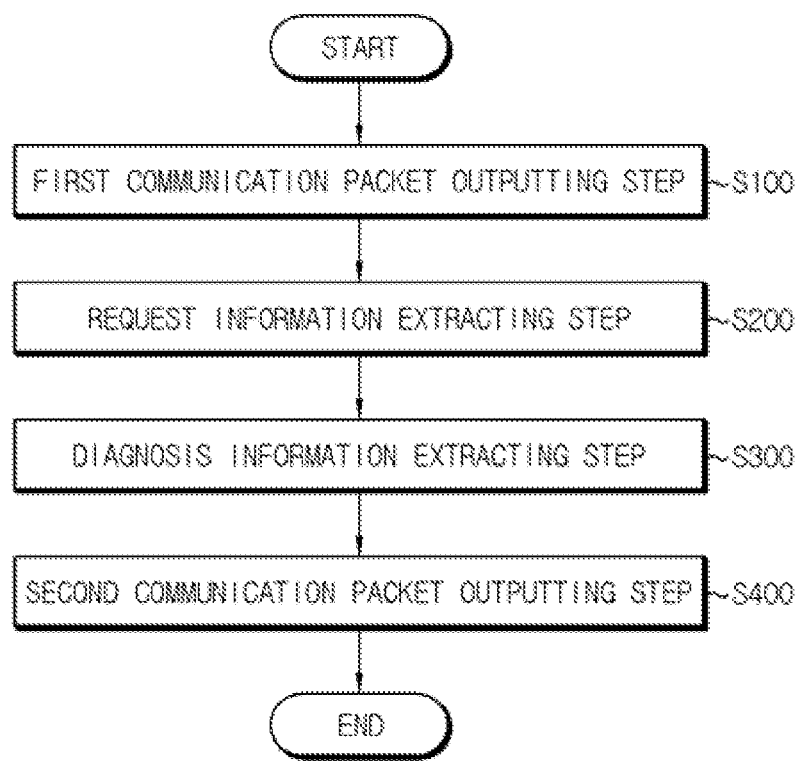
FIG. 7 is a diagram schematically showing a communication method according to another embodiment of the present disclosure.

FIG. 7 is a diagram schematically showing a communication method according to another embodiment of the present disclosure.

Each step of the communication method may be performed by the communication system 10 according to an embodiment of the present disclosure. Hereinafter, for convenience of description, the content overlapping with the previously described content will be omitted or briefly described.

Referring to FIG. 7, the communication method may include a first communication packet outputting step (S100), a request information extracting step (S200), a diagnosis information extracting step (S300), and a second communication packet outputting step (S400).

The first communication packet outputting step (S100) is a step of generating a first communication packet including request information for each generated diagnostic trouble codes when at least one diagnostic trouble code is generated, and outputting the generated first communication packet, and may be performed by the information requesting device 100.

For example, the information requesting device 100 may generate a communication packet including request information by using the first packet structure shown in FIG. 3. In this case, the information requesting device 100 may include a plurality of request information in one first communication packet.

The request information extracting step (S200) is a step of receiving the first communication packet and extracting each request information included in the received first communication packet, and may be performed by the information providing device 200.

That is, the information providing device 200 and the information requesting device 100 may be configured to be able to communicate with each other through the communication bus B.

The diagnosis information extracting step (S300) is a step of extracting diagnosis information corresponding to each request information extracted in the request information extracting step (S200), and may be performed by the information providing device 200.

Specifically, the information providing device 200 may determine at least one data identifier corresponding to the extracted request information based on the provided data identifier list. If a plurality of request information are extracted from the first communication packet, the information providing device 200 may determine at least one data identifier for each of the plurality of request information. In addition, the information providing device 200 may extract diagnosis information corresponding to the determined data identifier.

For example, the diagnostic trouble code may be generated by the information providing device 200. Accordingly, the information providing device 200 may store a data identifier and diagnosis information corresponding to the generated diagnostic trouble code. Accordingly, the information providing device 200 may extract diagnosis information corresponding to the determined data identifier from the plurality of diagnosis information previously stored.

The second communication packet outputting step (S400) is a step of generating a second communication packet including answer information and at least one diagnosis information corresponding to each other to be distinguished from each other and outputting the generated second communication packet, and may be performed by the information providing device 200.

For example, the information providing device 200 may generate a communication packet including answer information and at least one diagnosis information to be distinguished from each other by using the second packet structure shown in FIG. 4.

The embodiments of the present disclosure described above may not be implemented only through an apparatus or a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: communication system
100: information requesting device
200: information providing device
B: communication bus

What is claimed is:

1. A communication system, comprising:
an information requesting device configured to:
in response to a plurality of diagnostic trouble codes being generated, generate a first communication packet including request information for each of the plurality of generated diagnostic trouble codes; and
output the generated first communication packet; and
an information providing device configured to:
receive the first communication packet;
automatically distinguish each diagnostic trouble code of the plurality of diagnostic trouble codes included in the received first communication packet from one another;
for each automatically distinguished diagnostic trouble code of the plurality of diagnostic trouble codes included in the received first communication packet:
extract the request information for the diagnostic trouble code; and
extract diagnosis information corresponding to the extracted request information;
generate a second communication packet including:
answer information including, for each diagnostic trouble code of the plurality of diagnostic trouble codes for which the request information is extracted, an identification of the diagnostic trouble code; and
for each answer information, a portion of the diagnosis information corresponding to the extracted request information for the diagnostic trouble code identified by the answer information, the portion of the diagnosis information including values of one or more diagnostic measurements corresponding to the answer information; and
transmit the generated second communication packet to the information requesting device.

2. The communication system according to claim 1,
wherein the plurality of diagnostic trouble codes include at least a first diagnostic trouble code and a second diagnostic trouble code, and the information requesting device is configured to further include delimiter information for distinguishing the first diagnostic trouble code from the second diagnostic trouble code in the first communication packet.

3. The communication system according to claim 2,
wherein the information providing device is configured to automatically distinguish the first diagnostic trouble code and the second diagnostic trouble code from one another in the received first communication packet based on the delimiter information.

4. The communication system according to claim 3,
wherein the information providing device is configured to further include the delimiter information in the second communication packet in order to distinguish the answer information and the portion of the diagnosis information from each other.

5. The communication system according to claim 1,
wherein the information providing device includes a data identifier list preset for each extracted request information and is configured to, for each diagnostic trouble code included in the received first communication packet:
determine a data identifier corresponding to the request information based on the data identifier list; and
extract the diagnosis information corresponding to the determined data identifier.

6. A communication system, comprising:
an information requesting device configured to:
in response to one or more diagnostic trouble codes being generated, generate a first communication packet including request information for each of the one or more generated diagnostic trouble codes; and
output the generated first communication packet; and
an information providing device configured to:
receive the first communication packet;
automatically distinguish each diagnostic trouble code of the plurality of diagnostic trouble codes included in the received first communication packet from one another;
for each automatically distinguished diagnostic trouble code included in the received first communication packet:
extract the request information for the diagnostic trouble code; and
extract diagnosis information corresponding to the extracted request information;
generate a second communication packet including:
answer information including, for each diagnostic trouble code of the one or more diagnostic trouble codes for which the request information is extracted, an identification of the diagnostic trouble code; and
for each answer information, a portion of the diagnosis information corresponding to the extracted request information for the diagnostic trouble code identified by the answer information, the portion of the diagnosis information including values of one or more diagnostic measurements corresponding to the answer information; and transmit the generated second communication packet to the information requesting device;

wherein the information requesting device is configured to:

select at least one target identifier from the data identifier list; and include an identification number for the selected at least one target identifier in the first communication packet, and wherein the information providing device includes the data identifier list and is configured to, for each diagnostic trouble code included in the received first communication packet:

determine the target identifier corresponding to the request information based on the data identifier list; and extract the diagnosis information corresponding to the target identifier.

7. The communication system according to claim 6, wherein the information requesting device is configured to, for each generated diagnostic trouble code, include a corresponding identification number of the selected at least one target identifier in the first communication packet.

8. The communication system according to claim 6, wherein, for a plurality of selected target identifiers having identification numbers that are consecutive, the information requesting device is configured to include in the first communication packet a representative number from the identification numbers and a number indicating a quantity of the selected target identifiers.

9. The communication system according to claim 6, wherein the information providing device is configured to, for each diagnostic trouble code included in the received first communication packet:

extract the identification number from the first communication packet;

determine a target identifier corresponding to the identification number in the data identifier list; and extract diagnosis information corresponding to the determined target identifier.

10. An electric vehicle, comprising the communication system according to claim 1.

11. A communication method, comprising:

generating, by an information requesting device, a first communication packet including request information for each of a plurality of generated diagnostic trouble codes;

outputting, by the information requesting device, the generated first communication packet;

receiving, by an information providing device, the first communication packet;

automatically distinguishing, by the information providing device, each diagnostic trouble code of the plurality of diagnostic trouble codes included in the received first communication packet from one another;

for each automatically distinguished diagnostic trouble code of the plurality of diagnostic trouble codes included in the received first communication packet:

extracting, by the information providing device, the request information of the diagnostic trouble code included in the received first communication packet;

extracting, by the information providing device, diagnosis information corresponding to the extracted request information; and generating, by the information providing device, a second communication packet including:

answer information including, for each diagnostic trouble code of the plurality of diagnostic trouble codes for which the request information is extracted, an identification of the diagnostic trouble code; and for each answer information, a portion of the diagnosis information corresponding to the extracted request information for the diagnostic trouble code identified by the answer information, the portion of the diagnosis information including values of one or more diagnostic measurements corresponding to the answer information, and outputting the generated second communication packet.

12. The communication system according to claim 1, wherein the information requesting device is communicatively coupled to a plurality of electronic control units (ECUs) of an electric vehicle, and wherein the plurality of diagnostic trouble codes are generated by the plurality of ECUs.

13. A communication method, comprising:

generating, by an information requesting device, a first communication packet including request information for each of one or more generated diagnostic trouble codes by selecting at least one target identifier from a data identifier list preset for each request information and including an identification number for the selected at least one target identifier in the first communication packet;

outputting, by the information requesting device, the generated first communication packet;

receiving, by an information providing device, the first communication packet;

automatically distinguishing each diagnostic trouble code included in the received first communication packet from one another;

for each automatically distinguished diagnostic trouble code included in the received first communication packet:

extracting, by the information providing device, the request information of the diagnostic trouble code included in the received first communication packet;

determining, by the information providing device, the target identifier corresponding to the request information based on the data identifier list;

extracting, by the information providing device, diagnosis information corresponding to the target identifier; and generating, by the information providing device, a second communication packet including:

answer information including, for each diagnostic trouble code of the one or more diagnostic trouble codes for which the request information is extracted, an identification of the diagnostic trouble code; and for each answer information, a portion of the diagnosis information corresponding to the extracted request information for the diagnostic trouble code identified by the answer information, the portion of the diagnosis information including values of one or more diagnostic measurements corresponding to the answer information, and outputting the generated second communication packet.

* * * * *